United States Patent
Kanitz et al.

(10) Patent No.: US 6,353,059 B2
(45) Date of Patent: Mar. 5, 2002

(54) POLYADDUCTS PRODUCED FROM NONLINEAR-OPTICALLY ACTIVE COPOLYMERS AND POLYMERIZABLE NONLINEAR-OPTICALLY ACTIVE MONOMERS

(75) Inventors: Andreas Kanitz, Hoechstadt; Horst Hartmann, Merseburg; Christian Fricke, Berlin; Karsten Kuhne, Kreuzau, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/727,007

(22) Filed: Nov. 30, 2000

Related U.S. Application Data

(62) Division of application No. 09/265,444, filed on Mar. 9, 1999, now Pat. No. 6,174,961.

(30) Foreign Application Priority Data

Mar. 9, 1998 (DE) .......................................... 198 10 065

(51) Int. Cl.$^7$ ................................................. C08F 8/00
(52) U.S. Cl. ........................ 525/191; 525/418; 525/430; 528/423; 428/423.1
(58) Field of Search ................................. 525/191, 418, 525/43; 528/423; 428/423.1

(56) References Cited

U.S. PATENT DOCUMENTS

| 4,796,976 A | 1/1989 | Leslie et al. |
| 4,915,491 A | 4/1990 | DeMartino et al. |

FOREIGN PATENT DOCUMENTS

| DE | 196 39 381 A1 | 3/1998 |
| EP | 0 350 112 A1 | 1/1990 |
| EP | 0 477 665 A1 | 4/1992 |
| GB | 2 240 548 A | 8/1991 |

OTHER PUBLICATIONS

Martin J. Goodwin: "Electro–optic Waveguide Devices", in G.J. Ashwell et al.: "Organic Materials for Nonlinear Optics", Royal Society of Chemistry, Cambridge, 1993, pp. 332–343.

Paras N. Prasad: "Recent Advances in Polymeric and Composite Materials for Non–linear Optics", in G.J. Ashwell et al.: "Organic Materials for Nonlinear Optics", Royal Society of Chemistry, Cambridge, 1993, pp. 139–154.

Tobin J. Marks et al.: "Entwurf, Synthese und Eigenschaften von Molekülaggregaten mit ausgeprägten nichtlinearen optischen Eigenschaften zweiter Ordnung", Angew. Chem. 1995, 107, pp. 167–187, draft, synthesis and properties of molecular aggregates having distinctive nonlinear–optical characteristics of the second order.

J.D. Swalen et al.: "Poled Epoxy Polymers for Optoelectronics" in J. Messier et al. (ed.): "Organic Molecules for Nonlinear Optics and Photonics", Kluwer Academic Publishers, Dordrecht, 1991, pp. 433–445.

K. D. Singer: "Orientally Ordered Electro–Optic Materials", in Paras N. Prasad et al. (ed.): "Nonlinear Optical and Electroactive Polymers", Plenum Press, New York, 1988, pp. 189–204.

David F. Eaton: "Nonlinear Optical Materials, The Great amd Near Great" American Chemical Society, 1991, pp. 128–155.

R. C. Alferness: "Titanium–Diffused Lithium Niobate Waveguide Devices", in Theodor Tamir (ed.): "Guided–Wave Optoelectronics", Springer Verlag, Berlin, 1988, pp. 145–210.

Karl J. Ebeling: "Integrierte Optoelektronik", Springer Verlag Berlin, 1989, pp. 152–162, integrated opto–electronics.

R. A. Norwood et al.: "Optical Polymers and multifunctional Materials", in Lawrence A. Hornak: "Polymers for lightwave and integrated optics", Marcel Dekker, Inc., New York, 1992, pp. 287–320.

*Primary Examiner*—Duc Truong
(74) *Attorney, Agent, or Firm*—Herbert L. Lerner; Laurence A. Greenberg; Werner H. Stemer

(57) ABSTRACT

The present invention relates to nonlinear-optically active copolymers which are composed of a chromophore acrylate, a glycidyl-functional acrylate, and a further acrylate unit, and to polyadducts produced from them by crosslinking with a carboxyl-functional polyester. The nonlinear-optical copolymers of the present invention, and the polyadducts prepared from them, possess an orientation stability in the crosslinked state, and a thermal stability, which makes them highly suitable for producing electrooptical and photonic components.

21 Claims, No Drawings

POLYADDUCTS PRODUCED FROM NONLINEAR-OPTICALLY ACTIVE COPOLYMERS AND POLYMERIZABLE NONLINEAR-OPTICALLY ACTIVE MONOMERS

CROSS-REFERENCE TO RELATED APPLICATION

This is a division of U.S. application No. 09/265,444, filed Mar. 9, 1999, now U.S. Pat. No. 6,174,961.

BACKGROUND OF THE INVENTION

1. Field of the Invention

The invention relates to polyadducts produced from nonlinear-optically active copolymers and polymerizable nonlinear-optically active monomers, i.e., for electrooptical and photonic components.

Electrooptical and photonic components are important elements in nonlinear optics and in optical information technology. They are planar waveguide structures whose function can be altered by an electrical voltage. They comprise modulators, Mach-Zehnder modulators, tunable and switchable directional couplers, wavelength filters, including tunable wavelength filters, and polarization-modifying waveguide components. Their construction is described, for example, by R. C. Alferness in T. Tamir "Guided-Wave Optoelectronics", Springer-Verlag Berlin, Heidelberg 1988, pages 145 to 210, and in K. J. Ebeling "Integrierte Optoelektronik", 1st edition, Springer-Verlag Berlin, Heidelberg 1989, pages 152 to 162.

Components of this kind can be produced using highly anisotropic inorganic crystals which have a high 2nd-order susceptibility.

In the past, organic materials and polymers having high 2nd-order susceptibilities have also been developed. They feature considerable advantages in terms of their preparation and their use in electrooptical and photonic components. Polymers having nonlinear-optical (NLO) properties are known from the literature; in this context see, for example: S. R. Marder, J. E. Sohn, G. D. Stucky "Materials for Nonlinear Optics", ACS Symposium Series, Vol. 455 (1991), pages 128 to 156, R. A. Norwood et al. in L. A. Hornak "Polymers for Lightwave and Integrated Optics", Marcel Dekker, Inc., New York 1992, pages 287 to 320, and G. J. Ashwell, D. Bloor "Organic Materials for Nonlinear Optics", Royal Society of Chemistry, Cambridge 1993, pages 139 to 155 and 332 to 343.

An overview of current problems in the development of materials having pronounced NLO properties was recently published by T. J. Marks and M. A. Ratner in Angew. Chem. 107 (1995), pages 167 to 187. In addition to the requirements that have to be set for nonlinear-optical chromophores, reference is also made to the problems in developing polymeric matrices for the embedding or binding of chromophores, and their orientation-stable alignment.

In order for such polymers, which are provided with covalently bonded or dissolved NLO chromophores, become nonlinear-optically active and have a high 2nd-order susceptibility, the chromophores must be oriented in an electrical field (in this respect, see: J. D. Swalen et al. in J. Messier, F. Kajzar, P. Prasad "Organic Molecules for Nonlinear Optics and Photonics", Kluwer Academic Publishers 1991, pages 433 to 445). This normally takes place in the region of the glass transition temperature, where the mobility of the chain segments of the polymers allows orientation of the NLO chromophores. The orientation obtained in the field is then frozen in by cooling. The 2nd-order susceptibility $\chi^{(2)}$ that is achievable here is proportional to the spatial density of the hyperpolarizability $\beta$, to the ground-state dipole moment $\mu_o$ of the chromophores, to the electrical poling field, and to parameters which describe the distribution of orientation following the poling process (in this respect, see: K. D. Singer et al. in P. N. Prasad, D. R. Ulrich "Nonlinear Optical and Electroactive Polymers", Plenum Press, New York 1988, pages 189 to 204).

Great interest attaches to compounds combining high dipole moment with high values of $\beta$. Consequently, investigation has focused in particular on those chromophores which consist of conjugated $\pi$ electron systems that carry an electron donor at one end and an electron acceptor at the other end and are covalently bonded to a polymer: for example, to polymethyl methacrylate (U.S. Pat. No. 4,915,491), polyurethane (EP-A 0 350 112), or polysiloxane (U.S. Pat. No. 4,796,976).

One particular problem of said polymer materials having NLO properties is the relaxation of the oriented chromophore units and thus the loss of NLO activity. At present, this relaxation is still preventing the production of electrooptical components with long-term stability that are deployable technically.

SUMMARY OF THE INVENTION

It is therefore the object of the present invention to provide nonlinear-optically active copolymers and polyadducts produced from them by means of which post-orientation relaxation of the nonlinear-optically active units in the NLO polymers is prevented or at least retarded. Moreover, the nonlinear-optically active polymers should exhibit low optical losses. The aim of the present invention is in particular to provide NLO polymers with which relaxation of the chromophores is prevented up to temperatures of above 100° C. and which comprise those nonlinear-optical units which ensure thermal stability at temperatures of more than 200° C. In addition to this, the NLO polymers should allow extremely wide variation of the optical properties of the electrooptical and photonic components.

In order to achieve this object the present invention provides nonlinear-optically active copolymers of the general formula 1

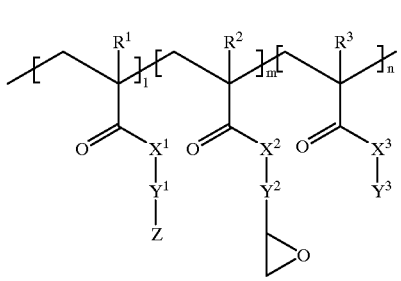

in which $R^1$, $R^2$, $R^3$, $X^1$, $X^2$, $X^3$, $Y^1$, $Y^2$, $Y^3$, Z, l, m and n are as defined below. These are, therefore, nonlinear-optical, glycidyl-functional copolymers which in accordance with the invention can be reacted by crosslinking with a carboxyl-functional polyester having an appropriate degree of polymerization, to give the polyadducts that are likewise of the present invention.

The use of polyadducts based on glycidyl-functional nonlinear-optically active copolymers is known per se. DE-A 196 39 381 proposes a material for which a polymer comprising a nonlinear-optical group and glycidyl groups is crosslinked by coreaction with cyanates or prepolymers in order to achieve a stable orientation of the chromophore units. However, it has been found that the resulting material possesses only a low film-forming tendency, and low thermal stability under poling conditions.

Surprisingly, it has been possible to eliminate these is disadvantages by virtue of the nonlinear-optically active copolymers of the general formula 1 of the present invention and, respectively, by the polyadducts obtained from them by crosslinking with a carboxyl-functional polyester.

The nonlinear-optical polyadducts of the present invention are prepared by crosslinking a nonlinear-optically active copolymer of the general formula 1 having a proportion from 5 to 95 mol % of glycidyl groups, preferably from 20 to 80 mol %, and having a proportion of from 5 to 95 mol %, preferably from 20 to 80 mol %, of simple linear or branched and also cyclic esters, preferably of the cyclohexyl series, with at least one carboxyl-functional polyester. Advantageously, there are from 0.1 to 5 gram equivalents of the polyester component, based on the number of carboxyl groups employed, preferably from 0.4 to 2.7 gram equivalents, per gram equivalent of glycidyl groups of the NLO copolymer. As a result of the coreaction of the glycidyl groups of the NLO copolymer and the polyester component, tightly crosslinked polymer layers are produced in the polymer film.

In the production of the electrooptical or photonic components, the above-mentioned orientation and crosslinking take place on a support, where the crosslinked polyadduct forms the functional layer which is arranged between two buffer layers. With advantage, one or both buffer layers of the electrooptical or photonic components according to the invention can also consist, like the functional layer, of an appropriate crosslinked NLO polymer. It is known that in that case the refractive index of the buffer layers is somewhat lower than that of the functional layer. The required difference in refractive index (from the light-guiding functional layer or from its waveguide structure) is established by means of an appropriate composition of the copolymers with and without nonlinear-optical units.

The nonlinear-optically active, glycidyl-functional copolymers are preferably compounds of the general formula 1:

In this formula:

$R^1$, $R^2$, $R^3$ are identical or different from one another and are H, $CH_3$ or halogen;

$X^1$, $X^2$, $X^3$ are identical or different from one another and are O or $NR^4$, where $R^4$ is H or a linear or branched $C_{1-}$ to $C_{6-}$-alkyl radical;

$Y^1$ is a linear or branched hydrocarbon chain having 2 to 20 carbon atoms, where one or more nonadjacent $CH_2$ groups, with the exception of the $CH_2$ group providing the link to the radical Z, can be replaced by O, S or $NR^5$, where $R^5$ is H or a linear or branched $C_{1-}$ to $C_{6-}$ alkyl radical;

$Y^2$ is a linear or branched hydrocarbon chain having 1 to 3 carbon atoms;

$Y^3$ is a linear or branched $C_{1-}$ to $C_{20-}$ alkyl radical, a $C_{5-}$ to $C_{7-}$ cycloalkyl radical or a bi- or tricyclic alkyl radical having up to 18 carbon atoms;

Z is a nonlinear-optically active group; and l:m:n=1 . . . 99:1 . . . 99:1 . . . 99.

DESCRIPTION OF THE PREFERRED EMBODIMENTS

Preferably, in the copolymer of formula 1:

$R^1=R^2=R^3=CH_3$, $X^1=X^2=X^3=O$, $Y^1=(CH_2)_o$, where o=2 to 6, $Y^2=CH_2$, $Y^3$=cyclohexyl, norbornyl, adamantyl or methyl, and l:m:n=10 . . . 50:10 . . . 30:20 . . . 80.

The radicals $R^4$ and $R^5$, which can be the same or different, are in particular a methyl, ethyl, propyl, isopropyl, butyl, isobutyl, sec-butyl, pentyl, isopentyl, neopentyl, hexyl or 2-methylpentyl radical.

The nonlinear-optically active group Z can, for example, be a chromophore of the azo dye, stilbene dye, or polymethine dye type. Preferably, the group Z has a structure of the general formula 2:

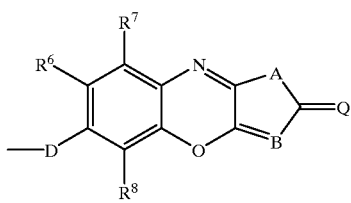

which is attached by D to $Y^1$ and where

D is O, S or $NR^9$ where $R^9$ is a hydrogen atom, a linear or branched $C_{1-}$ to $C_{20-}$ alkyl radical which is uninterrupted or interrupted by 1 to 5 oxygen atoms in ether function, or is a benzyl radical or a phenyl or naphthyl radical, or $R^9$ and $Y^1$ together with the nitrogen atom connecting them, form a pyrrolidinyl, piperidinyl, morpholinyl or piperazinyl radical, $R^6$, $R^7$, $R^8$ are independently of one another a hydrogen atom, a linear or branched $C_{1-}$ to $C_{20-}$ alkyl radical which is uninterrupted or interrupted by 1 to 5 oxygen atoms in ether function or are a phenyl, naphthyl, thienyl, thiazolyl or pyridyl radical, Q is an electron-acceptor-substituted methylene or imino group, A is S, O. $NR^{10}$ or a ring double bond, or is

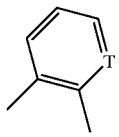

where $R^{10}$ is a hydrogen atom, a linear or branched $C_{1-}$ to $C_{20-}$ alkyl radical or a phenyl or naphthyl radical and T is CH or N or, if desired, Q and T together form a structure of the type $=N-SO_2-C\equiv$, $=N-CS-C\equiv$ or $=N-CO-C\equiv$, and B is a CH or $CR^{11}$ group or is N, where $R^{11}$ is a linear or branched $C_{1-}$ to $C_{20-}$ alkyl radical, a phenyl radical or a naphthyl radical.

The radicals $R^6$ to $R^{11}$ can in particular be a methyl, ethyl, propyl, isopropyl, butyl, isobutyl, sec-butyl, pentyl, isopentyl, neopentyl, tert-pentyl, hexyl, 2-methyl-pentyl, heptyl, octyl, 2-ethylhexyl, isooctyl, isononyl, decyl or isodecyl radical, and also the corresponding alkoxy or alkenyl radicals (the terms isooctyl, isononyl and isodecyl in this list are trivial names derived from the alcohols obtained in an oxo synthesis; in this respect, see: "Ullmann's Encyclopedia of Industrial Chemistry", 5th Edition, Vol. A1, pages 290 to 293, and Vol. A10, pages 284 and 285).

With particular preference, $R^6$, $R^7$ and $R^8$ are each a nitrogen atom, A is a sulfur atom or a 1,2-fused benzene ring, B is a CH group, and Q is a dicyanomethylene group. Furthermore, Q and T together preferably form a structure =N—SO$_2$—C≡. Q can, moreover, be an alkoxycarbonylcyanomethylene, cyanoimino or alkoxycarbonylimino group. D is preferably a substituted amino radical.

Compounds of the general formula 2 are described in detail in the simultaneously filed German Patent Application 198 10 030.2 ("Chromophoric compounds and process for their preparation").

Z can also be an azamethine of the following structure 2B:

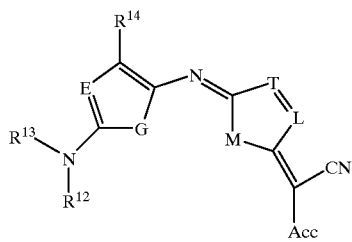

2B which is linked to Y$^1$ through R$^{12}$ and where

R$^{12}$ and R$^{13}$ are identical or different from one another and are in each case a linear or branched C$_{1-}$ to C$_{20-}$ alkyl radical which can be interrupted by up to five ether oxygen atoms, a phenyl, naphthyl, thienyl, thiazolyl or pyridyl radical or R$^{12}$ and R$^{13}$ together form a five- or six-membered carbocyclic or heterocyclic ring;

R$^{14}$ is a hydrogen atom, a hydroxyl or acyloxy group, a linear or branched C$_{1-}$ to C$_{20-}$ alkyl radical or a phenyl radical which is optionally substituted in the para position by a halogen, hydroxyl or acyloxy group;

G denotes S, Se, O or NR$^4$, where R$^4$ is a hydrogen atom or a linear or branched C$_{1-}$ to C$_{20-}$ alkyl radical, or denotes a ring double bond or a 1,2-fused benzene ring;

E denotes a CH or CR$^5$ group, where R$^5$ is a linear or branched C$_{1-}$ to C$_{20-}$ alkyl radical, a phenyl or a naphthyl radical, or denotes N; and M denotes S, Se, O or NR$^6$, where R$^6$ is a hydrogen atom or a linear or branched C$_{1-}$ to C$_{20-}$ alkyl radical, or denotes a ring double bond or a 1,2-fused benzene ring;

T and L are identical or different from one another and each denotes a CH or CR$^7$ group, where R$^7$ is a C$_{1-}$ to C$_{20-}$ alkyl radical, an optionally substituted phenyl or a naphthyl radical, or denotes N, or T and L together denote a ring double bond or a 1,2-fused benzene ring, with the proviso that when G is a ring double bond, T and L together and M are not simultaneously a ring double bond and a 1,2-fused benzene ring; and Acc is a nitrile, C$_{1-}$ to C$_{20-}$ alkoxycarbonyl, formyl, acyl, arylsulfonyl or nitro group.

Compounds of this kind are described in detail in the simultaneously filed German Patent Application 198 10 063.9 ("Process for preparing azamethines, and azamethines themselves").

The nonlinear-optically active copolymers are amorphous copolymers comprising comonomers which have covalently bonded nonlinear-optical molecule units and comonomers with crosslinking-active functional groups. The preparation of the copolymers by free-radical polymerization and the synthesis of the precursors take place either in accordance with the conventional processes and/or are described in the working examples.

The free-radical polymerization is able to take place by means of free-radical initiators which decompose on heating. Initiators of this kind which are used are preferably azoisobutyronitrile and peroxy compounds, such as dibenzoyl peroxide.

The role of crosslinking-active component in the present invention is played by a carboxyl-functional polyester of the general formula 3:

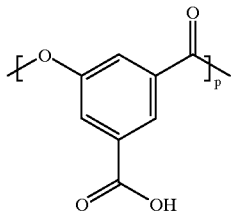

3

In this formula, p denotes values between 10 and 350, preferably between 100 and 150. These values represent degrees of polymerization which are suitable in the context of the present invention. The polyesters are either commercially available or can be produced by corresponding polymerization of a suitably substituted isophthalic acid ester.

To improve the surface quality, the processability and/or the compatibility with polymers it is possible to add processing auxiliaries to the polyadducts of the invention, depending on the intended application. Examples of these auxiliaries are thixotropic agents, flow-control agents, plasticizers, wetting agents, lubricants, and binders.

The polyadducts according to the invention are applied in dissolved or liquid form, together if desired with crosslinking-active compounds or initiators, to a substrate by spin coating, dipping, printing or brushing. In this way a nonlinear-optical arrangement is obtained in which the polyadducts or corresponding prepolymers—before or during crosslinking—are given a polar alignment in electrical fields. After cooling, polymer materials having excellent nonlinear-optical properties and—by virtue of the crosslinking—increased orientation stability and thus increased long-term stability, even at relatively high service temperatures, are obtained.

In order to produce the nonlinear-optical materials it is particularly advantageous to use oligomeric prepolymers of the adducts of the invention. These prepolymers are prepared conventionally, with the copolymers comprising nonlinear-optically active glycidyl groups and simple linear, branched or cyclic esters being reacted with an excess of the carboxyl-functional polyester compound. Following application to a substrate, the prepolymers undergo polar alignment—at a temperature above the glass transition temperature—and are subsequently crosslinked in an applied electrical field to give the nonlinear-optical polyadducts having an improved profile of properties.

Other features which are considered as characteristic for the invention are set forth in the appended claims.

Although the invention is illustrated and described herein as embodied in nonlinear-optically active copolymers, polyadducts produced from them, and their use for nonlinear-optical media, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

The working examples which follow are intended to illustrate the invention, and describe the synthesis of novel nonlinear-optically active compounds (Examples 1 to 6) and of glycidyl-functional nonlinear-optically active copolymers (Example 7), of a polyester crosslinker (Example 8), and of polyadducts (Example 9) and their crosslinking (Example 10), and electrooptical investigations (Example 11).

The following abbreviations are used in the examples:

m.p.=melting point;
b.p.=boiling point;
yld.=yield;
decomp.=decomposition.

EXAMPLE 1

Methacrylate of benzo [a]-5-dicyanomethylene-9-[N-(n-butyl)-N-(2-hydroxyethyl)amino]-7,12-phenoxazine a) 0.11 mol of n-butyl bromide and 0.1 mol of $NaHCO_3$ are added to 0.1 mol of m-aminophenol in 150 ml of methanol and the mixture is refluxed for 5 h. After cooling, the mixture is filtered and the solvent is removed in vacuo. The oil which remains is fractionated in vacuo, to give 3-(n-butyl-amino)phenol in a yield of 57%; b.p. 110° C. ($6 \cdot 10^{-5}$ torr), m.p. 35° C.

b) 0.1 mol of 3-(n-butyl-amino)phenol in 100 ml of methanol is refluxed for 10 h with 0.11 mol of 2-bromoethanol and 0.1 mol of $NaHCO_3$. After cooling, the mixture is filtered, the solvent is removed in vacuo and the residue is fractionated, to give 3-[N-(n-butyl)-N-(2-hydroxyethyl)amino]-phenol in a yield of 54%; b.p. 130–140° C. ($5 \cdot 10^{-5}$ torr), m.p. 45–47° C.

c) 0.05 mol of compound of b) is dissolved in 50 ml of HCl-saturated propanol and 0.1 mol of isoamyl nitrite is added. After 20 minutes, 150 ml of diethyl ether are added and the product formed is filtered off with suction, to give N-(n-butyl)-N-(2-hydroxyethyl)-N'-hydroxyquinone-diiminium chloride in a yield of 76%; m.p. 127° C. (decomp.).

d) 0.01 mol of the compound of c) is heated briefly at boiling with 0.011 mol of 1-naphthylmalononitrile and 0.02 mol of triethylamine in 15 ml of dimethylformamide. After cooling, water is added and the product which precipitates is extracted with dichloroethane. Following distillative removal of the solvent, the residue is purified by repeated chromatography over silica gel, using ethyl acetate as eluent, to give 9-[N-(n-butyl)-N-(2-hydroxyethyl)amino]-5-dicyanomethylenebenzo[a]-phenoxazine, a compound of the following structure:

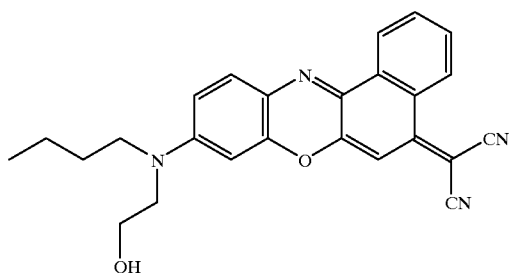

Yld. 30%, m.p. 190° C., $\lambda_{max}$: 618 nm (in toluene).

e) 0.005 mol of the dye of d) is heated over a water bath for 1 h with 0.005 mol of methacryloyl chloride and 0.005 mol of triethylamine in 100 ml of tetrahydrofuran. The mixture is subsequently evaporated to dryness and the residue is taken up in dichloromethane. Following removal of the solvent, the residue is purified over silica gel using ethyl acetate as eluent, to give the title compound; m.p. 115° C., yld. 53%.

EXAMPLE 2

Methacrylate of benzo[a]-5-dicyanomethylene-9-[N-(n-heptyl)-N-(2-hydroxyethyl)amino]-7,12-phenoxazine a) 0.11 mol of n-heptyl bromide and 0.1 mol of $NaHCO_3$ are added to 0.1 mol of m-aminophenol in 150 ml of methanol and the mixture is refluxed for 5 h. After cooling, the mixture is filtered and the solvent is removed in vacuo. The oil which remains is fractionated in vacuo, to give 3-(n-heptyl-amino)phenol; b.p. 130–140° C. ($8 \cdot 10^{-5}$ torr), m.p. 27–30° C., yld. 62%.

b) 0.1 mol of 3-(n-heptyl-amino)phenol in 100 ml of methanol is refluxed for 10 h with 0.11 mol of 2-bromoethanol and 0.1 mol of $NaHCO_3$. After cooling, the mixture is filtered, the solvent is removed in vacuo and the residue is fractionated, to give 3-[N-(n-heptyl)-N-(2-hydroxyethyl)amino]phenol; b.p. 160–170° C. ($1 \cdot 10^{-5}$ torr), m.p. 45–47° C., yld. 54%.

c) 0.05 mol of the compound of b) is dissolved in 50 ml of HCl-saturated propanol, and 0.1 mol of isoamyl nitrite is added. After 20 minutes, 150 ml of diethyl ether are added and the product which forms is filtered off with suction, to give N-(n-heptyl)-N-(2-hydroxyethyl)-N'-hydroxyquinone-diiminium chloride; m.p. 129° C. (decomp.), yld. 62%.

d) 0.01 mol of the compound of c) is heated briefly at boiling with 0.011 mol of 1-naphthylmalononitrile and 0.02 mol of triethylamine in 15 ml of dimethylformamide. After cooling, water is added and the product which precipitates is extracted with dichloroethane. Following distillative removal of the solvent, the residue is purified by repeated chromatography over silica gel, using ethyl acetate as eluent, to give 9-[N-(n-heptyl)-N-(2-hydroxyethyl)amino]-5-dicyanomethylenebenzo-[a]phenoxazine, a compound of the following structure:

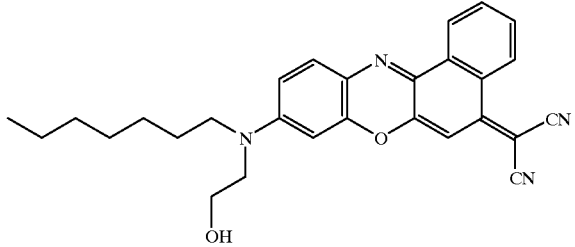

Yld. 28%, m.p. 155–157° C., $\lambda_{max}$: 622 nm (in toluene)

e) 0.005 ml of the dye of d) is reacted with 0.005 mol of methacryloyl chloride and 0.005 mol of triethylamine as in Example 1e to give the methacrylate of the dye, i.e., the title compound; m.p. 103–105° C., yld. 65%.

EXAMPLE 3

Methacrylate of 2-dicyanomethylene-6-[N-(n-butyl)-N-(2-hydroxyethyl)amino]thieno[3,2-b]benzo[e]oxazine a) In analogy to Example 1, 2-dicyanomethylene-6-[N-(n-butyl)-N-(2-hydroxyethyl)amino]thieno[3,2-b]-benzo[e]oxazine of the formula

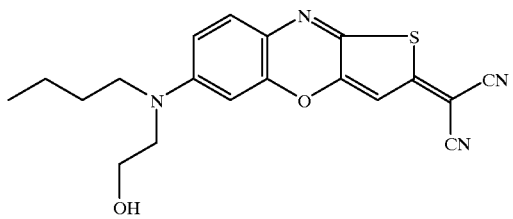

is prepared by refluxing 0.01 mol of N-(n-butyl)-N-(2-hydroxyethyl)-N'-hydroxyquinone-diiminium chloride (see Example 1c) with 0.01 mol of 2-thienylmalononitrile, which was prepared by reacting 0.13 mol of malononitrile in 100 ml of absolute tetrahydrofuran with 0.15 mol of sodium hydride, 0.0015 mol of [(C$_6$H$_5$)$_3$P]$_2$PdCl$_2$ and 25 g of 2-iodothiophene by boiling for 3 hours under reflux followed by neutralization with hydrochloric acid, in a yield of 45%, in 15 ml of dimethylformamide to which 0.02 mol of triethylamine was added, for several minutes. After cooling, the resultant solution is diluted with water and the dye precipitated in the course of dilution is isolated by filtration with suction. It is purified by repeated column chromatography over silica gel using ethyl acetate as eluent; yld. 23%, m.p. 260° C.

b) The dye is converted into the methacrylate—in accordance with Example 1—by reaction with methacryloyl chloride in the presence of triethylamine.

EXAMPLE 4

Methacrylate of 9-[N-(n-heptyl)-N-(2-hydroxyethyl)-amino]benzo[d]isothiazolo[3,3a,4-ab] phen-7,12-oxazine4-dioxide In analogy to Example 2, N-(n-heptyl)-N-(2-hydroxyethyl)-N'-hydroxyquinone-diiminium chloride (see Example 2c) and 1,8-naphthosultam are used to prepare a phenoxazine dye of the following structure (m.p. 178–180° C., yld. 35%):

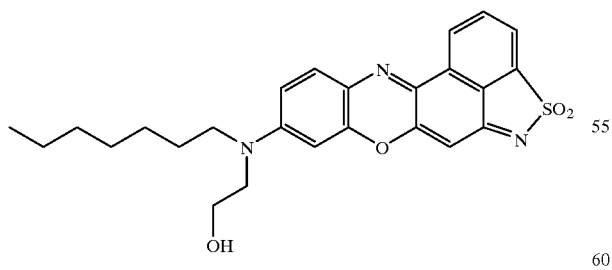

By reaction with methacryloyl chloride in tetrahydrofuran to which freshly distilled triethylamine has been added, the dye is converted into the methacrylate of the following structure:

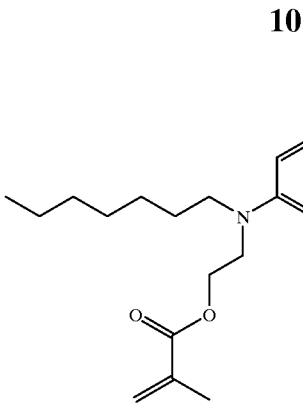

EXAMPLE 5

Benzo [a]-5-cyanoimino-9-[N-(n-butyl)-N-(2-hydroxy-ethyl) -amino]-7,12-phenoxazine In analogy to Example 1, N-(n-butyl)-N-(2-hydroxyethyl)-N'-hydroxyquinone-diiminium chloride (see Example 1c) and N-cyano-1-naphthylamine are used to prepare a phenoxazine dye of the following structure (m.p. 173–175° C., yld. 25%):

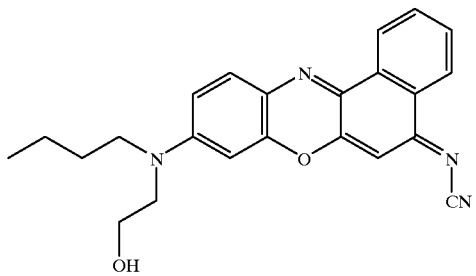

By reaction with methacryloyl chloride in tetrahydrofuran to which freshly distilled triethylamine has been added, the dye is subsequently converted into the methacrylate of the following structure:

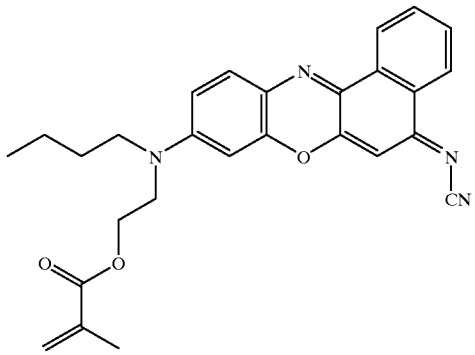

EXAMPLE 6

Pyridino[2,3-a]-5-cyanoimino-9-[N-(n-butyl)-N-(2-hydroxyethyl)amino]-7,12-phenoxazine In analogy to Example 1, N-(n-butyl)-N-(2-hydroxyethyl)-N'-hydroxyquinone-diiminium chloride (see Example 1c) and 8-cyanoaminoquinoline are used to prepare a phenoxazine dye of the following structure (m.p. 185–187° C., yld. 32%):

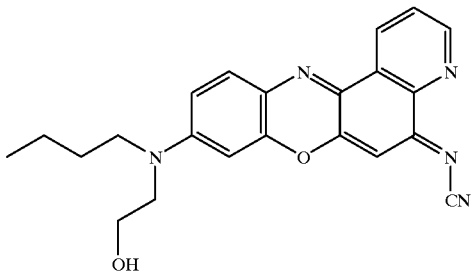

By reaction with methacryloyl chloride in tetrahydrofuran to which freshly distilled triethylamine has been added, the dye is subsequently converted into the methacrylate of the following structure:

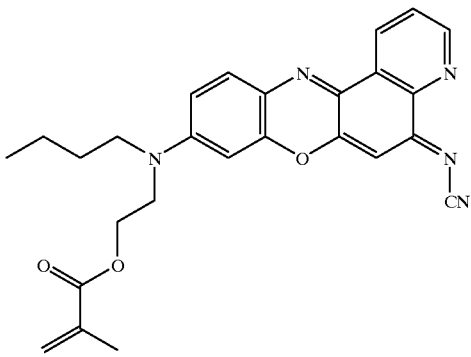

EXAMPLE 7

Synthesis of Glycidyl-functional Nonlinear-optically Active Copolymers

For the copolymerization of 1 moles of nonlinear-optically active chromophore methacrylates—for example, of the oxazine dyes in accordance with Example 2 (P2a to P2c)—with m moles of glycidyl methacrylate and n moles of cyclohexyl methacrylate the three components together with 2 mol % of azoisobutyronitrile are reacted in oxygen-free absolute chlorobenzene (90% by mass, based on the amount of dye) under argon in a Schlenk tube at 75° C.; the reaction period is from 18 to 24 hours. The crude product of this reaction is dissolved completely by adding tetrahydrofuran and is precipitated from methanol. In order to purify the copolymer, it is reprecipitated a number of times. The results obtained in this procedure are summarized in Table 1 ($T_G$=glass transition temperature).

TABLE 1

| Polymer No. | Composition 1:m:n mol % | % Yield | $T_g$ ° C. |
|---|---|---|---|
| P2a | 33:15:52 | 87 | 133 |
| P2b | 25:15:60 | 85 | 127 |
| P2c | 20:15:65 | 92 | 118 |

EXAMPLE 8

Synthesis of a Polyester Crosslinker

5-Acetoxyisophthalic acid is refluxed in glacial acetic acid until the desired degree of polymerization is attained; thereafter, the resulting polyester is precipitated by dropwise introduction into water. The molecular weight distribution is determined by gel permeation chromatography.

EXAMPLE 9

Synthesis of Polyadducts 2 parts by weight of the polyester prepolymer of Example 8 and 98 parts by weight of a glycidyl-functional nonlinear-optical copolymer in accordance with Example 7 are dissolved homogeneously in cyclohexanone at 20° C.; in the course of dissolution there is slight crosslinking.

EXAMPLE 10

Crosslinking of the Polyadducts

For crosslinking, the adducts of the polyester resin and of the glycidyl-functional nonlinear-optically active copolymer of Example 9 are applied to suitable support materials, such as glass, ITO-coated glass (ITO—indium-tin-oxide) or silicon wafers, by spin coating from a solution, preferably in cyclohexanone, and are freed from the solvent in vacuo at elevated temperature, preferably at 70° C. for 15 hours. Subsequently, the substrate is provided with a covering electrode and is slowly heated in an electrical DC field to the glass transition temperature of the respective material; during this heating procedure, the material of the coating undergoes dipolar alignment and simultaneous crosslinking.

The reaction conditions and the results obtained are summarized in Table 2 ($T_G$=glass transition temperature)

TABLE 2

| Polyadduct from prepolymer | Cure cycle and temperature | $T_g$ after cure ° C. |
|---|---|---|
| P1a *) | 125° C., 1 h | 145 |
| P2a | 135° C., 1 h | 152 |

*) P1a = Chromophore methacrylate of Example 1 with a composition ratio corresponding to prepolymer P2a.

EXAMPLE 11

Electrooptical Investigations

For the electrooptical investigations, films of the polyadducts of the invention are produced with, customarily, is a film thickness of from 2 to 6 μm. For the electrical poling, in order to achieve a high noncentrosymmetrical orientation, a gold electrode is applied to the film (of the polyadduct) by sputtering; the counterelectrode is a transparent ITO layer. While the sample is being heated up to the region of the glass transition temperature, a direct voltage is applied, with the required increase in voltage being adjusted to the orientation behavior of the nonlinear-optical molecule units, in order to avoid electrical breakdown and thus destruction of the film. Once a poling field strength of from 100 to 200 V/μm has been reached, a poling period of about 30 minutes is sufficient to orient the nonlinear-optical molecule units. Thereafter, the sample is cooled—with a constantly applied field—to room temperature, thereby fixing the orientation.

The electrooptical investigations of the polymer samples are made by interferometric measurement of a laser beam, beamed in obliquely, following single reflection at the gold electrode. The measurement setup required for this purpose, and the evaluation of the measurement, are known (see, for example: Appl. Phys. Lett., Vol. 56 (1990), pages 1734 to 1736).

Using the nonlinear-optically active copolymers and the polyadducts obtained by pre-crosslinking with a carboxyl-functional polyester, according to the invention, it is possible to produce, in a known manner, electrooptical and photonic components, in which the polyadducts, as already mentioned, can be employed as functional layers and/or buffer layers.

We claim:

1. A polyadduct which is formed from nonlinear-optically active terpolymer of the general formula 1

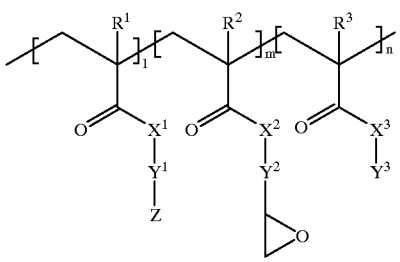

$R^1$, $R^2$, $R^3$ are identical or different from one another and are H, $CH_3$ or halogen;

$X^1$, $X^2$, $X^3$ are identical or different from one another and are O or $NR^4$, where $R^4$ is H or a linear or branched $C_{1-}$ to $C_{6-}$ alkyl radical;

$Y^1$ is a linear or branched hydrocarbon chain having 2 to 20 carbon atoms, where one or more nonadjacent $CH_2$ groups, with the exception of the $CH_2$ group providing the link to the radical Z, can be replaced by O, S or $NR^5$, where $R^5$ is H or a linear or branched $C_{1-}$ to $C_{6-}$ alkyl radical;

$Y^2$ is a linear or branched hydrocarbon chain having 1 to 3 carbon atoms;

$Y^3$ is a linear or branched $C_{1-}$ to $C_{20-}$ alkyl radical, a $C_{5-}$ to $C_{7-}$ cycloalkyl radical or a bi- or tricyclic cycloaliphatic radical having up to 18 carbon atoms;

Z is a nonlinear-optically active group; and l:m:n=1 . . . 99:1 . . . 99:1 . . . 99, and at least one crosslinking agent based on a carboxyl-functional polyester.

2. The polyadduct according to claim 1, in which the polyester is a 5-hydroxyisophthalic ester of the general formula 3:

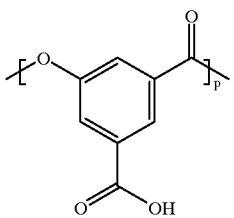

in which p is a value between 10 and 350.

3. The polyadduct according to claim 2 characterized in that p is a value between 100 and 150.

4. A nonlinear-optical medium comprising a substrate, at least one functional layer including a polyadduct according to claim 1, and at least one buffer layer.

5. The nonlinear-optical medium according to claim 4, in which the substrate is indium-tin oxide.

6. The nonlinear-optical medium according to claim 4, in which at least one buffer layer includes a polyadduct as claimed in claim 1.

7. A polymerizable nonlinear-optically active monomer represented by the formula

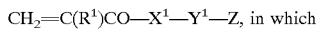

$R^1$ is H, $CH_3$ or halogen;

$X^1$ is O or $NR^4$, where $R^4$ is H or a linear or branched $C_{1-}$ to $C_{6-}$ alkyl radical;

$Y^1$ is a linear or branched hydrocarbon chain having 2 to 20 carbon atoms, where one or more nonadjacent $CH_2$ groups, with the exception of the $CH_2$ group providing the link to the radical Z, can be replaced by O, S or $NR^5$, where $R^5$ is H or a linear or branched $C_{1-}$ to $C_{6-}$ alkyl radical; and Z is a nonlinear-optically active group of the general formula 2:

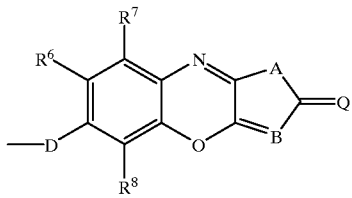

which is attached by D to $Y^1$ and where

D is O, S or $NR^9$ where $R^9$ is a hydrogen atom, a linear or branched $C_{1-}$ to $C_{20-}$ alkyl radical which is uninterrupted or interrupted by 1 to 5 ether oxygen atoms, or is a benzyl radical or a phenyl or naphthyl radical, or $R^9$ and $Y^1$ together with the nitrogen atom connecting them, form a pyrrolidinyl, piperidinyl, morpholinyl or piperazinyl radical, $R^6$, $R^7$, $R^8$ are each a hydrogen atom, a linear or branched $C_{1-}$ to $C_{20-}$ -alkyl radical which is uninterrupted or interrupted by 1 to 5 ether oxygen atoms or are a phenyl, naphthyl, thienyl, thiazolyl or pyridyl radical, Q is an electron-acceptor-substituted methylene or imino group, A is S, O, $NR^{10}$ or a ring double bond, or is

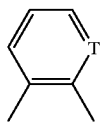

where $R^{10}$ is a hydrogen atom, a linear or branched $C_{1-}$ to $C_{20-}$ alkyl radical or a phenyl or naphthyl radical and T is CH or N, or Q and T together form a structure of the type $=N-SO_2-C\equiv$, $=N-CS-C\equiv$ or $=N-CO-C\equiv$, and B is a CH or $CR^{11}$ group or is N, where $R^{11}$ is a linear or branched $C_{1-}$ to $C_{20-}$ alkyl radical, a phenyl radical or a naphthyl radical.

8. The nonlinear-optically active polymerizable monomer according to claim 7, in which $R^1$ is $CH_3$.

9. The nonlinear-optically active polymerizable monomer according to claim 7, in which $X^1$ is O.

10. The nonlinear-optically active polymerizable monomer according to claim 7, in which $Y^1$ is a $C_{2-}$ to $C_{6-}$ hydrocarbon chain.

11. The nonlinear-optically active polymerizable monomer according to claim 7, in which $R^6$, $R^7$ and $R^8$ are each H.

12. The nonlinear-optically active polymerizable monomer according to claim 7, in which A is S or a 1,2-fused benzene ring.

13. The non-linear optically active polymerizable monomer according to claim 7, in which B is a CH group.

14. The nonlinear-optically active polymerizable monomer according to claim 7, in which Q is a dicyanomethylene group or together with T forms a structure =N—SO$_2$—C≡.

15. The nonlinear-optically active polymerizable monomer according to claim 7, in which Q is an alkoxycarbonylcyanomethylene, cyanoimino or alkoxycarbonylimino group.

16. The nonlinear-optically active polymerizable monomer according to claim 7, which is methacrylate of benzo[a]-5-dicyanomethylene-9-[N-(n-butyl)-N-(2-hydroxyethyl)amino]-7,12-phenoxazine.

17. The nonlinear-optically active polymerizable monomer according to claim 7, which is methacrylate of benzo[a]-5-dicyanomethylene-9-[N-(n-heptyl)-N-(2-hydroxyethyl)amino]-7,12-phenoxazine.

18. The nonlinear-optically active polymerizable monomer according to claim 7, which is methacrylate of 2-dicyanomethylene-6-[N-(n-butyl)-N-(2-hydroxyethyl)amino]-thieno[3,2-b]benzo[e]oxazine.

19. The nonlinear-optically polymerizable monomer according to claim 7, which is methacrylate of 9-[N-(n-heptyl)-N-(2-hydroxyethyl)amino]-benzo[d]isothiazolo[3,3a,4-ab]-phen-7,12-oxazine-4-dioxide.

20. The nonlinear-optically active polymerizable monomer according to claim 7, which is methacrylate of benzo[a]-5-cyanoimino-9-[N-(n-butyl)-N-(2-hydroxyethyl)amino]-7,12-phenoxazine.

21. The nonlinear-optically active polymerizable monomer according to claim 7, which is methacrylate of pyridino[2,3-a]-5-cyanoimino-9-[N-(n-butyl)-N-(2-hydroxyethyl)amino]-7,12-phenoxazine.

* * * * *